United States Patent
Fujii et al.

(10) Patent No.: US 7,843,618 B2
(45) Date of Patent: Nov. 30, 2010

(54) METHOD FOR CONTROLLING IMAGE-FORMING APPARATUS

(75) Inventors: Kazunari Fujii, Kawasaki (JP); Yasuhiro Shimada, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 1062 days.

(21) Appl. No.: 10/576,609

(22) PCT Filed: Jun. 14, 2005

(86) PCT No.: PCT/JP2005/011215
§ 371 (c)(1), (2), (4) Date: Apr. 21, 2006

(87) PCT Pub. No.: WO2006/001235
PCT Pub. Date: Jan. 5, 2006

(65) Prior Publication Data
US 2007/0052797 A1  Mar. 8, 2007

(30) Foreign Application Priority Data

Jun. 29, 2004  (JP) .............................. 2004-192338
May 9, 2005   (JP) .............................. 2005-135499

(51) Int. Cl.
G02B 26/08 (2006.01)
G02B 26/00 (2006.01)
G02F 2/00 (2006.01)

(52) U.S. Cl. ...................... 359/196.1; 359/237; 359/325
(58) Field of Classification Search ................. 358/474; 359/196.1, 237, 325
See application file for complete search history.

(56) References Cited

U.S. PATENT DOCUMENTS 4,317,611 A  3/1982 Peterson .................... 359/214

(Continued)

FOREIGN PATENT DOCUMENTS

JP  57-8520  1/1982

(Continued)

OTHER PUBLICATIONS

European Search Report dated Mar. 22, 2010, from corresponding European Application No. 05751083.6.

Primary Examiner—Benny Q Tieu
Assistant Examiner—Ngon Nguyen
(74) Attorney, Agent, or Firm—Fitzpatrick, Cella, Harper & Scinto

(57) ABSTRACT

Even in an image-forming apparatus including an optical deflection apparatus using a light source such as a high-power laser light source, a variation in temperature of an optical deflector due to modulation of deflected light based on drawing data is compensated to maintain a preferable oscillation state of the optical deflection apparatus. The optical deflection apparatus includes an optical deflector in which an oscillator is supported by an elastic support member to be oscillatable about a support substrate and at least one light source, and the optical deflection apparatus is controlled such that total power of light emitted from the light source to the optical deflector within each of a plurality of divided time regions corresponding to specific times of equal lengths becomes a predetermined power. A changed temperature of the optical deflector which is caused due to a variation in power of light emitted from the light source to the optical deflector may be corrected by a temperature control element based on the power of the light emitted from the light source to the optical deflector within the specific time to control the optical deflection apparatus.

8 Claims, 5 Drawing Sheets

U.S. PATENT DOCUMENTS

| | | | |
|---|---|---|---|
| 4,738,502 A * | 4/1988 | Mikami et al. | 385/4 |
| 5,247,384 A | 9/1993 | Inoue et al. | 359/199 |
| 5,415,978 A * | 5/1995 | Asami et al. | 430/363 |
| 6,297,898 B1 | 10/2001 | Tanijiri et al. | 359/224 |
| 6,670,603 B2 | 12/2003 | Shimada et al. | 250/235 |
| 6,803,843 B2 | 10/2004 | Kato et al. | 335/78 |
| 6,924,915 B2 | 8/2005 | Hirose et al. | 359/224 |
| 2004/0105139 A1 * | 6/2004 | Hirose et al. | 359/226 |
| 2004/0240017 A1 * | 12/2004 | Kandori et al. | 359/196 |
| 2007/0071055 A1 | 3/2007 | Fujii | 372/50.11 |

FOREIGN PATENT DOCUMENTS

| | | |
|---|---|---|
| JP | 3-154019 | 7/1991 |
| JP | 5-260267 | 10/1993 |
| JP | 2001-305471 | 10/2001 |

* cited by examiner

METHOD FOR CONTROLLING IMAGE-FORMING APPARATUS

TECHNICAL FIELD

The present invention relates to a method of controlling an optical deflection apparatus including an oscillator which can be formed using, for example, a technique related to a technical field of a micro-structure. In particular, the present invention relates to a method of controlling an image-forming apparatus using the optical deflection apparatus, such as a scanning display, a laser beam printer, or a digital copying machine.

BACKGROUND ART

Up to now, various optical deflection apparatuses in which a mirror is resonated have been proposed. As compared with a light-scanning optical system using a rotary polygonal mirror such as a polygon mirror, a resonance type optical deflection apparatus has the features that the size of the optical deflection apparatus can be significantly reduced; power consumption is small because a Q value is high; there is theoretically no optical facet angle error; an optical deflection apparatus made of single-crystalline Si manufactured by particularly a semiconductor process theoretically has no metal fatigue and excellent durability (see Japanese Patent Application Laid-Open No. S57-008520).

However, a resonance type optical deflector has a problem in which a material characteristic changes with a variation in ambient temperature to shift a resonance frequency, thereby dramatically reducing a deflection angle. In order to solve the problem, there have been proposed many methods capable of changing a drive frequency in response to a shift of the resonance frequency, including a method capable of changing a drive frequency of an excitation current applied in response to the shift of the resonance frequency by detecting the deflection angle based on induced electromotive force (see Japanese Patent Application Laid-Open No. 2001-305471).

There have been also proposed many methods capable of changing the resonance frequency based on temperature compensation, including a method of controlling the resonance frequency of an optical deflector by using a heater, a temperature sensor, and a temperature control circuit, which are provided for the optical deflector (Japanese Patent Application Laid-Open No. H05-2602 67).

Here, the temperature of the optical deflector is varied not only by ambient temperature but also by laser light modulated according to image data when laser light from a laser light source is deflected, As compared with the former variation by ambient temperature, the latter variation by the laser light is a very rapid change and its variation time can be estimated to be several tens of milliseconds or less. Here, in the case of a low-power laser light source, a variation in temperature thereof is negligibly small. However, when a high-power laser light source is used, a variation in temperature thereof is more significantly caused. In an image-forming apparatus using such an optical deflector, the resonance frequency of the optical deflector changes with a variation in temperature thereof, so that a projected image deteriorates.

A time required to stabilize a variation in oscillation state of the optical deflector is proportional to a Q value. Therefore, when the resonance type optical deflector has a high Q value, a stabilization time can be estimated to be several tens of milliseconds. Even when the temperature of the optical deflector is changed by a heater or the like, a stabilization time can be estimated to be several tens of milliseconds. As described above, a variation in temperature of the optical deflector due to the modulation of deflected light is caused on the same order as an oscillation stabilization time of the optical deflector. Thus, it is difficult to control the variation in temperature of the optical deflector due to the modulation of the deflected light using the above-mentioned conventional techniques.

DISCLOSURE OF INVENTION

In view of the above-mentioned problems, the present invention provides a method of controlling an image-forming apparatus including an optical deflection apparatus having an optical deflector in which an oscillator is supported by an elastic support portion to be oscillatable about a support substrate, temperature control means for controlling a temperature of the optical deflector, at least one light source, and modulation means for modulating the light source, wherein light from the light source is deflected by the optical deflector, and at least a part of the light is irradiated on an object to be irradiated to form an image, the method including controlling the temperature of the optical deflector by the temperature control means based on a modulation signal from the modulation means so as to stabilize a resonance frequency of the optical deflector.

In the above-mentioned method of the present invention, the temperature control means is preferably the light source which emits light other than drawing light for forming an image so as to stabilize a resonance frequency of the optical deflector, and a total amount of the light emitted from a light source to the optical deflector is preferably controlled such that the total amount becomes close to a predetermined amount within the arbitrary unit time.

In the above-mentioned method of the present invention, the temperature control means preferably include a heating element mounted on a part of the optical deflector adjusting a temperature of an optical deflector, and the temperature of the optical deflector is preferably controlled by the heating element so as to stabilize a resonance frequency of the optical deflector.

According to the present invention, even in an optical deflection apparatus using a light source such as a high-power laser light source, a variation in temperature of the optical deflector due to modulation of deflected light based on drawing data can be compensated by compensation light irradiation or compensation heating. Therefore, a preferable oscillating state can be maintained. Thus, a preferable image can be formed by an image-forming apparatus using the optical deflection apparatus according to the method of the present invention.

BEST MODES FOR CARRYING OUT THE INVENTION

Figure 1:
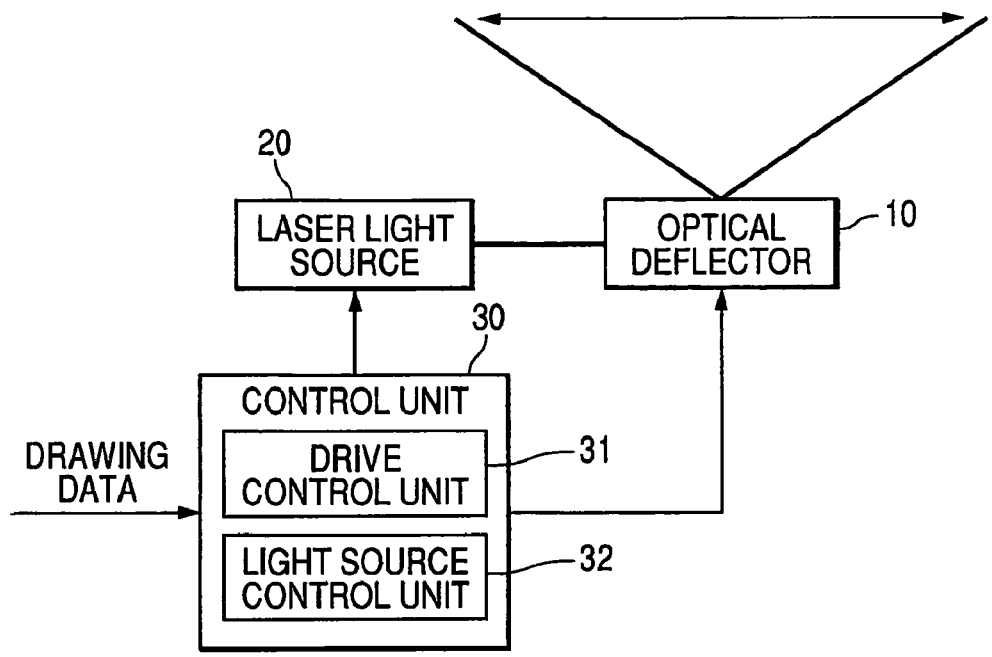
FIG. 1 is a schematic structural diagram for explaining a method of controlling an image-forming apparatus according to a first embodiment of the present invention.

Hereinafter, in order to understand the present invention, specific embodiments will be described with reference to the accompanying drawings.

First, reference numerals in the drawings will be described below. Reference numeral 1 denotes an image-forming apparatus; 10, an optical deflector; 20, 21 and 22, light sources (laser light source, drawing laser light source, and temperature compensation laser light source); 30, a control unit; 41, a drawing region; 42, a drawing time; 43, a non-drawing time; 44, a specific time (unit compensation time); 51, 65 and 72, objects to be irradiated (a projection surface, a photosensitive member, and a screen); and 60, a heating element.

First Embodiment

A first embodiment of the present invention will be described with reference to the drawings. FIG. 1 is a structural diagram for explaining a method of controlling an image-forming apparatus according to this embodiment. In this embodiment, the optical deflector 10 is composed of a movable plate (or an oscillator), a support substrate, and an elastic support member for supporting the movable plate so as to be rotationally twistable about the support substrate. The optical deflector 10 deflects modulated light from the laser light source 20 serving as a semiconductor laser capable of performing direct modulation. The optical deflector 10 is driven and controlled by a drive control unit 31 of the control unit 30. The laser light source 20 is modulated and driven by a light source control unit 32 having modulation means, of the control unit 30. The light source control unit 32 has a function for converting drawing data obtained from an outside into a modulation signal and modulating and driving the laser light source 20 based on the modulation signal and has temperature control means for performing modulation and driving so as to stabilize a resonance frequency of the optical deflector 10.

Figure 2:
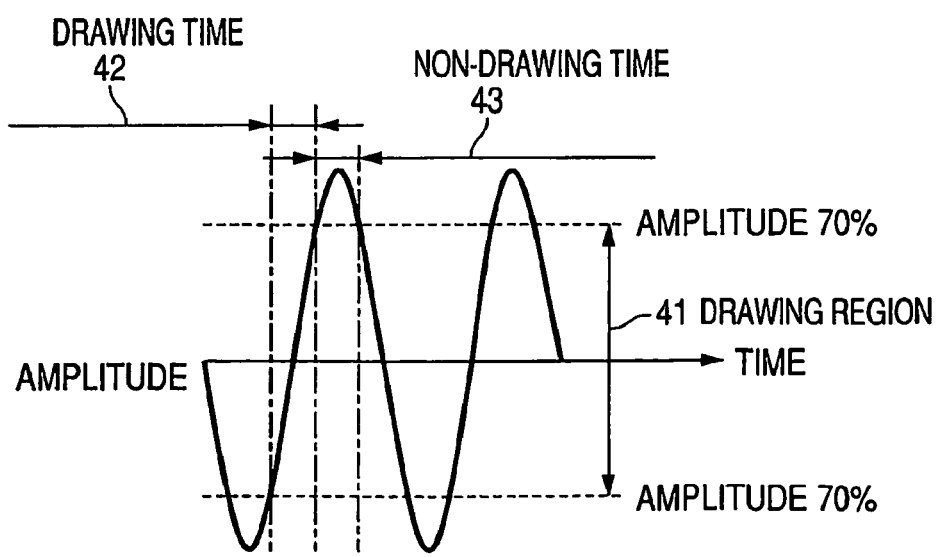
FIG. 2 is a graph showing an oscillation trail of an optical deflector in the image-forming apparatus.

The movable plate of the optical deflector 10 is driven for resonance, so that the driving becomes sinusoidal driving as shown in FIG. 2. In this embodiment, a region corresponding to 70% of the maximum amplitude of the movable plate is set as the drawing region 41. An image is formed on an object to be irradiated within the region by using deflection light caused by forward scanning and backward scanning of the optical deflector 10. Of course, the image may be formed by only one of the two.

Figure 3:
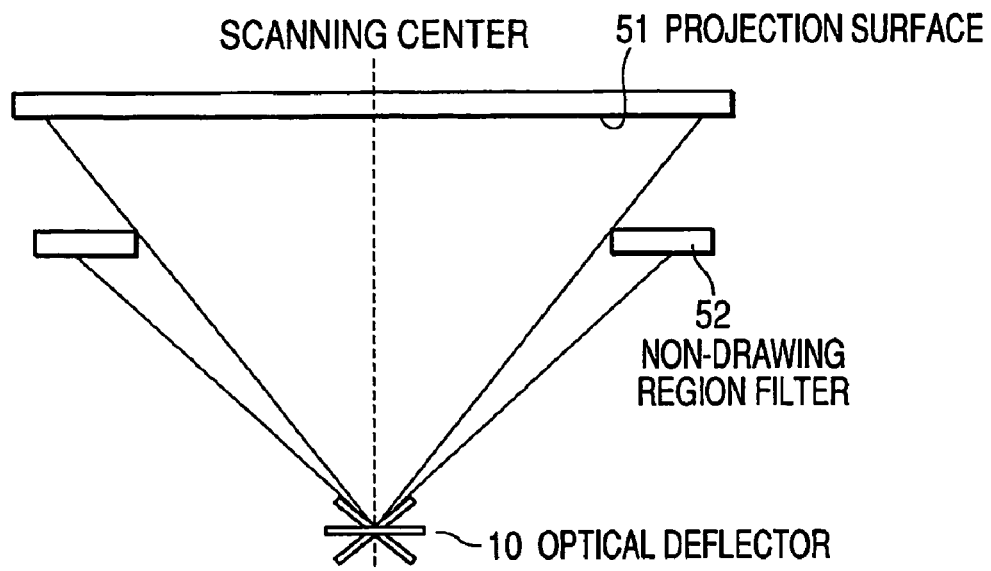
FIG. 3 is an explanatory view showing a non-drawing region filter in the image-forming apparatus.

A scanning time for the drawing region 41 is the drawing time 42 and the rest is the non-drawing time 43. The drawing time 42 accounts for about 49.4% of a total time and the non-drawing time 43 accounts for about 50.6% thereof. In this embodiment, the region corresponding to 70% of the maximum amplitude of the movable plate is set as the drawing region 41. However, this percentage may be any percentage. In this embodiment, as shown in FIG. 3, the non-drawing region filter 52 is provided to prevent deflection light other than light for the drawing region 41, of light deflected by the optical deflector 10 from reaching the projection surface 51 corresponding to the object to be irradiated.

Figure 4:
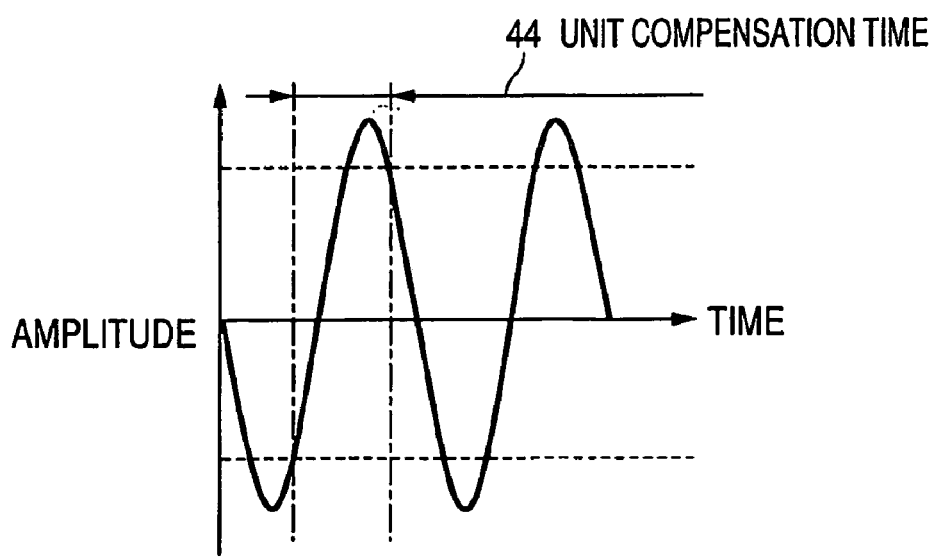
FIG. 4 is an explanatory view showing a unit compensation time.

Further, in this embodiment, in order to correct a shifted resonance frequency of the optical deflector 10 which is caused due to a variation in irradiation amount of modulated light based on the drawing data, a half of an oscillation period including the drawing time 42 and the non-drawing time 43 as shown in FIG. 4 is set as the unit compensation time 44. Control is performed such that the total power of light emitted from the laser light source 20 to the optical deflector 10 within each of the plurality of unit compensation times 44 becomes a predetermined power. More specifically, power of light which is emitted from the laser light source 20 within the drawing time 42 and absorbed by the optical deflector 10 is changed according to drawing data, so that the resonance frequency of the optical deflector 10 changes, thereby deteriorating an image. Therefore, the laser light source 20 emits light even within the non-drawing time 43. Thus, the total power of light with which the optical deflector 10 is irradiated within the unit compensation time 44 is constantly maintained to a predetermined power.

In other words, when the power of light with which the optical deflector 10 is irradiated within the drawing time 42 of the unit compensation time 44 is given by Pee and the power of light with which the optical deflector 10 is irradiated within the non-drawing time 43 thereof is given by Ped, power Pto of light with which the optical deflector 10 is irradiated within the unit compensation time 44 is expressed by Pto=Pee+Ped (Expression 1). The power Pto of light with which the optical deflector 10 is irradiated within the unit compensation time 44 is maintained to a predetermined power during an operating period of the image-forming apparatus. Therefore, the resonance frequency of the optical deflector 10 is stabilized regardless of drawing data, so preferable image formation can be realized.

The power Pee of light with which the optical deflector 10 is irradiated within the drawing time 42 can be grasped in advance by the light source control unit 32. Therefore, the power of light to be emitted within the non-drawing time 43 following the drawing time 42 is determined by the above Expression 1 based on the power, and the irradiation of light having the determined power is executed. In this embodiment, such irradiation control is executed for each of the successive unit compensation times 44. The control may be executed for each of the discrete (for example, alternate) unit compensation times 44. The former control has an excellent effect for stabilizing the resonance frequency. Even in the latter control, there is an effect for stabilizing the resonance frequency.

In this embodiment, the unit compensation time 44 is set to the half of the oscillation period including the drawing time 42 and the non-drawing time 43. It may be set to any time which is an integral multiple of a ¼ period (this is a minimum time which can include the drawing time 42 and the non-drawing time 43 at a predetermined rate in the case where a time is divided into the successive unit compensation times 44).

Second Embodiment

Figure 5:
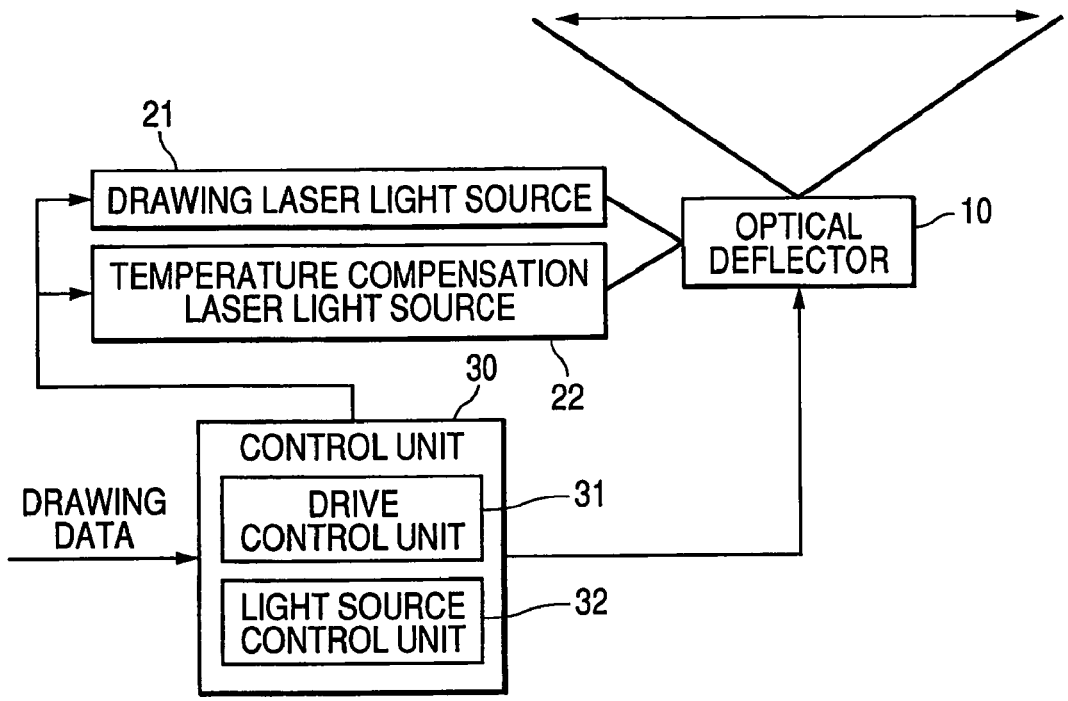
FIG. 5 is a schematic structural diagram for explaining a method of controlling an image-forming apparatus according to a second embodiment of the present invention.

Next, a second embodiment of the present invention will be described with reference to the drawings. FIG. 5 is a structural diagram for explaining a method of controlling an image-forming apparatus according to this embodiment. In FIG. 5, the optical deflector 10, the drawing laser light source 21, and the drive control unit 31 of the control unit 30 correspond to those of the first embodiment.

In this embodiment, in order to correct a shifted resonance frequency of the optical deflector 10 which is caused due to a variation in irradiation amount of modulated light based on the drawing data, the optical deflector is controlled such that the optical deflector 10 is irradiated with light from a temperature compensation laser light source 22 which is different from the drawing laser light source 21 and the total power of the light with which the optical deflector 10 is irradiated constantly becomes a predetermined power within the unit compensation time 44.

In other words, when power of light which is emitted from the drawing laser light source 21 within the unit compensation time 44 and absorbed by the optical deflector 10 is given by Pdr, and power of light which is emitted from the temperature compensation laser light source 22 and absorbed by the optical deflector 10 is given by Pco, the power Pto of light with which the optical deflector 10 is irradiated within the unit compensation time 44 is expressed by Pto=Pdr+Pco (Expression 2). Even in this embodiment, the power of light with which the optical deflector 10 is irradiated within the unit compensation time 44 is constantly maintained to a predetermined power during an operating period of the image-forming apparatus. Therefore, the resonance frequency of the optical deflector 110 is stabilized regardless of drawing data, so that preferable image formation can be realized.

Figure 6:
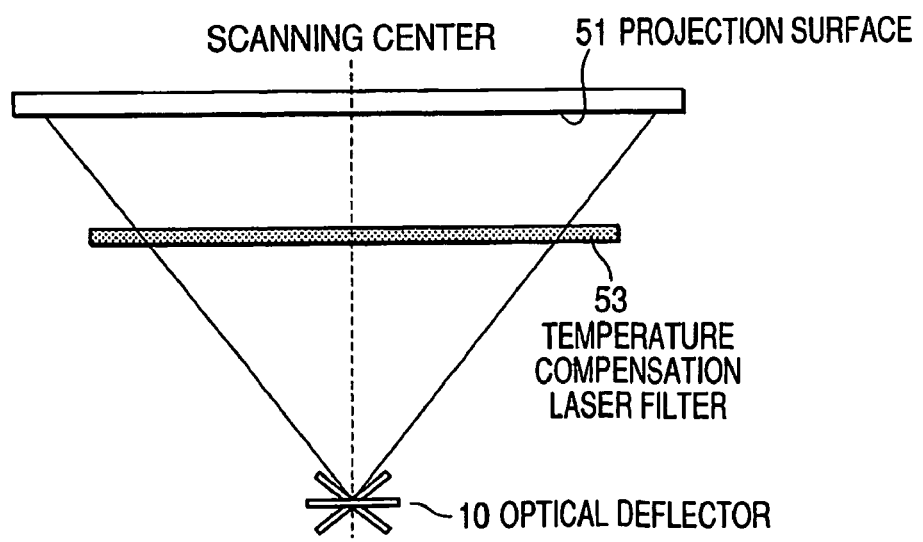
FIG. 6 is an explanatory view showing a temperature compensation laser filter in the image forming apparatus.

In this embodiment, as shown in FIG. 6, in order to prevent light from the temperature compensation laser light source 22 from being projected onto the projection surface 51, a frequency of the drawing laser light source 21 is made different from that of the temperature compensation laser light source 22. A temperature compensation laser filter 53 for absorbing light from the temperature compensation laser light source 22 is inserted between the optical deflector 10 and the projection surface 51. Therefore, in this embodiment, a time for emitting light from the temperature compensation laser light source 22 is not limited to within the non-drawing time 43 and may be any time within the unit compensation time 44. For example, the unit compensation time 44 is set as a pixel scanning time. The drawing laser light source 21 and the temperature compensation laser light source 22 are alternately driven with reverse modulation modes (for example, when one source is turned on, the other source is turned off) within each pixel scanning time. Thus, the total power of the light with which the optical deflector 10 is irradiated within the pixel scanning time can be also maintained to a predetermined power. When the frequency of the drawing laser light source 21 is equal to that of the temperature compensation laser light source 22, it is necessary that the time for emitting light from the temperature compensation laser light source 22 be within the non-drawing time 43.

Third Embodiment

Figure 7:
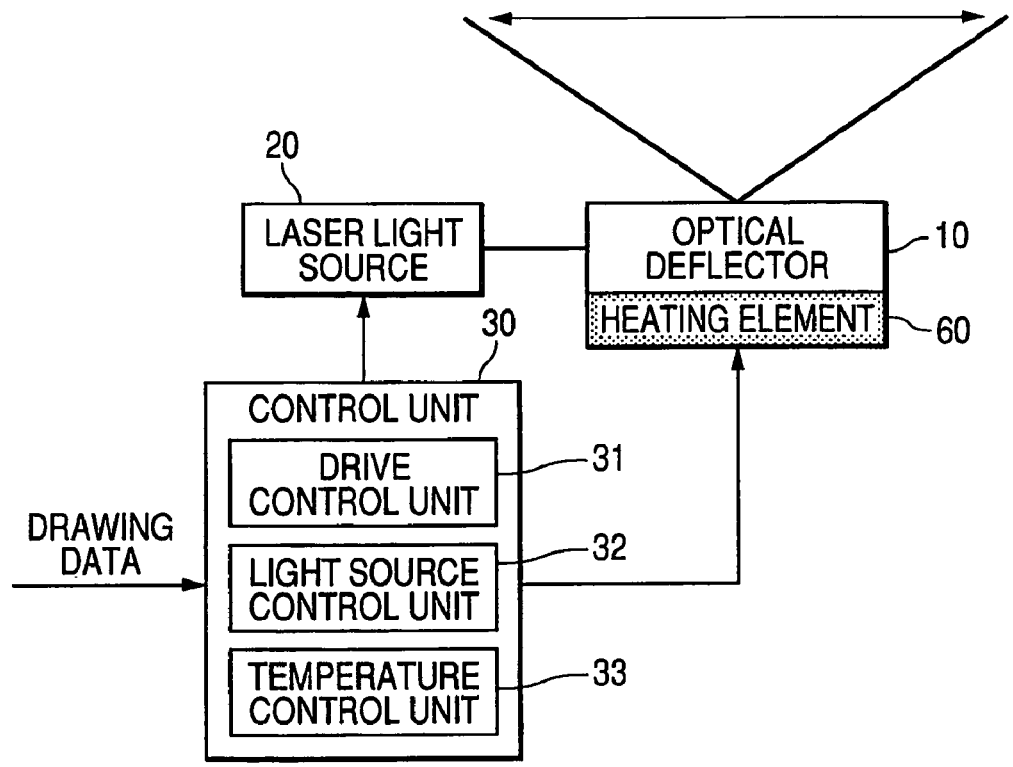
FIG. 7 is a schematic structural diagram for explaining a method of controlling an image-forming apparatus according to a third embodiment of the present invention.

Next, a third embodiment of the present invention will be described with reference to the drawing. FIG. 7 is a structural diagram for explaining a method of controlling an image-forming apparatus according to this embodiment. In this embodiment, the optical deflector 10, the laser light source 20, and the drive control unit 31 of the control unit 30 correspond to those in the first embodiment. The light source control unit 32 has only a function for converting drawing data obtained from an outside into a modulation signal and then modulating and driving the laser light source 20 based on the modulation signal. A temperature control unit 33 of the control unit 30 controls a temperature of the optical deflector 10 based on the modulation signal by using a heating element (temperature control element) 60.

In this embodiment, the temperature control element 60 is located close to the optical deflector 10. More particularly, a heater is mounted on the elastic support member of the optical deflector 10 (for example, a resistor is bonded thereto). Therefore, the temperature of the elastic support member is arbitrarily changed by the heater under the control of the temperature control unit 33 of the control unit 30. In this embodiment, the heater is used as the temperature control element 60 and mounted on the elastic support member. A temperature control element such as a Peltier element can be also used and mounted at any position of the optical deflector, such as a position on the movable plate.

In this embodiment, in order to correct the shifted resonance frequency of the optical deflector 10 based on the drawing data, the temperature control element 60 is controlled to correct a changed temperature of the optical deflector 10 which is caused by the laser light source 20. In other words, when power of light which is emitted from the laser light source 20 within the unit compensation time and absorbed by the optical deflector 10 is given by Pdr, and the amount of current supplied to the temperature control element 60 is given by 1, a temperature T of the optical deflector 10 which is maintained within the unit compensation time is expressed by T=C−Pdr+D−I (Expression 3). In Expression 3, C denotes a power-temperature conversion factor and D denotes a current-temperature conversion factor. The power-temperature conversion factor and current-temperature conversion factor are measured in advance and stored in the temperature control unit 33. The temperature T of the optical deflector 10 within the unit compensation time is constantly maintained to a predetermined temperature during an operating period of the image-forming apparatus. Therefore, the resonance frequency of the optical deflector 10 is stabilized regardless of drawing data, so that preferable image formation can be realized. The power Pdr of light with which the optical deflector 10 is irradiated within the drawing time 42 can be grasped in advance by the light source control unit 32. Based on the power, the temperature control unit 33 determines a current to be supplied to the heater using Expression 3 and executes the supply of the determined current.

In each of the above-mentioned embodiments, the unit compensation time is set to a time sufficiently shorter than the oscillation stabilization time of the optical deflector, i.e., to 1 μsec. The unit compensation time may be any time shorter than the oscillation stabilization time of the optical deflector.

Fourth Embodiment

Figure 8:
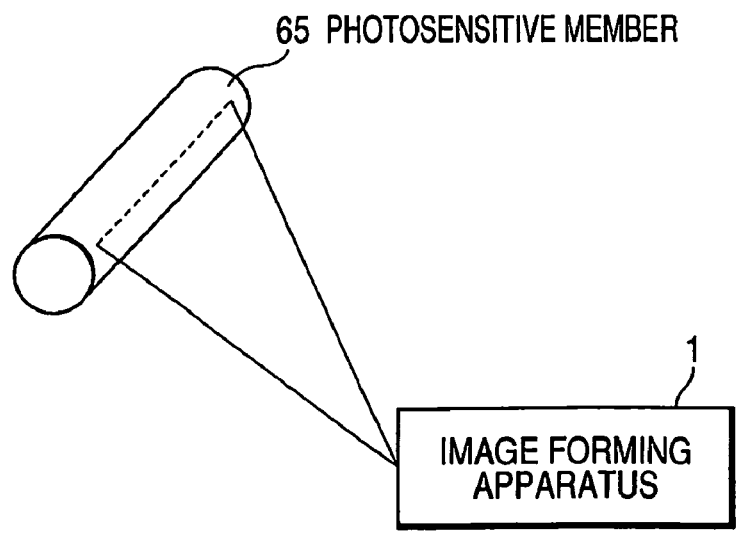
FIG. 8 is a schematic structural diagram for explaining a method of controlling an image-forming apparatus according to a fourth embodiment of the present invention.

Next, a fourth embodiment of the present invention will be described with reference to the drawing. FIG. 8 is a structural diagram for explaining a method of controlling an image-forming apparatus according to this embodiment. In this embodiment, the control method for the image forming apparatus (as described in each of the above-mentioned embodiments) according to the present invention is applied to a laser beam printer (LBP). According to the method for controlling the image-forming apparatus in this embodiment, the resonance frequency of the optical deflector is stabilized. Therefore, a preferable image can be formed on a photosensitive drum 6S regardless of drawing data.

Fifth Embodiment

Figure 9:
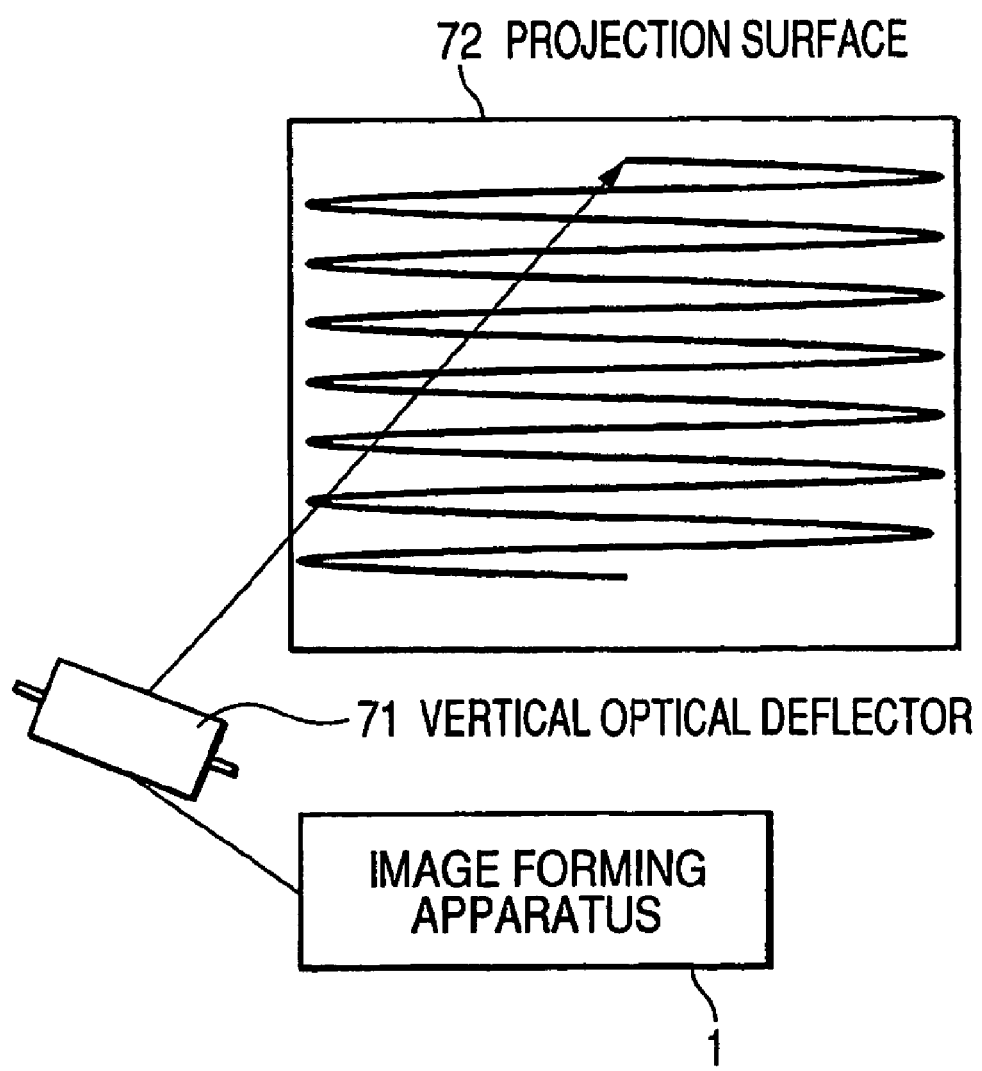
FIG. 9 is a schematic structural diagram for explaining a method of controlling an image-forming apparatus according to a fifth embodiment of the present invention.

Next, a fifth embodiment of the present invention will be described with reference to the drawing. FIG. 9 is a structural diagram for explaining a method of controlling an image-forming apparatus according to this embodiment. In this embodiment, the control method for the image forming apparatus according to the present invention is applied to a projector. One-dimensional scanning light from the image-forming apparatus 1 is projected and two-dimensionally scanned to the screen 72 by using a vertical optical deflector 71. Even in the method for controlling the image-forming apparatus according to this embodiment, the resonance frequency of the optical deflector is stabilized. Therefore, a preferable image can be formed on the screen 72 regardless of drawing data.

This application claims priority from Japanese Patent Applications No. 2004-192338 filed Jun. 29, 2004 and No. 2005-135499 filed on May 9, 2005, which is hereby incorporated by reference herein.

The invention claimed is:

1. A method of controlling an image-forming apparatus comprising an optical deflection apparatus including an optical deflector in which an oscillator is supported by an elastic support member to be oscillatable about a support substrate, a temperature controller for controlling a temperature of the optical deflector, at least one light source, and a modulator for modulating the light source, wherein light from the light source is deflected by the optical deflector, and at least a part of the light is irradiated on an object to be irradiated to form an image, the method comprising:

controlling the temperature of the optical deflector by the temperature controller by using a modulation signal from the modulator so as to set the temperature of the optical deflector at a predetermined temperature in a unit compensation time, wherein a half of an oscillation period including a drawing time for irradiating the light to the object to be irradiated and a non-drawing time for not irradiating the light to the object to be irradiated is set as the unit compensation time.

2. A method of controlling an image-forming apparatus according to claim 1, wherein the temperature controller is the light source which emits light other than drawing light for forming the image to the optical deflector so as to stabilize the resonance frequency of the optical deflector.

3. A method of controlling an image-forming apparatus according to claim 2, wherein a total amount of the light emitted from the light source to the optical deflector within the unit compensation time is controlled such that the total amount becomes close to a predetermined amount.

4. A method of controlling an image-forming apparatus according to claim 3, wherein an amount of light emitted from the light source to the optical deflector within the non-drawing time is controlled based on an amount of light emitted to the optical deflector within the drawing time to control a total amount of the light emitted from the light source to the optical deflector within the unit compensation time so as to becomes close to a predetermined amount.

5. A method of controlling an image-forming apparatus according to claim 3, wherein the unit compensation time is an integral multiple of ¼ of the oscillating period of the oscillator in the optical deflector.

6. A method of controlling an image-forming apparatus according to claim 1, wherein the light source is a single light source.

7. A method of controlling an image-forming apparatus according to claim 1, wherein the light source is a light source having a plurality of different wavelengths, and wherein a filter for preventing light other than drawing light from the light source from reaching the object to be irradiated is provided.

8. A method of controlling an image-forming apparatus according to claim 1, wherein the temperature controller comprises a heating element mounted on a part of the optical deflector, and wherein the temperature of the optical deflector is controlled by the heating element so as to stabilize the resonance frequency of the optical deflector.

* * * * *